United States Patent [19]

Niebur

[11] Patent Number: 5,025,992
[45] Date of Patent: Jun. 25, 1991

[54] HAY FEEDING APPARATUS

[76] Inventor: Mark J. Niebur, 602 S. 1st Ave. West, Malta, Mont. 59538

[21] Appl. No.: 443,779

[22] Filed: Nov. 30, 1989

[51] Int. Cl.⁵ .................. A01D 87/02; B02C 13/286
[52] U.S. Cl. ............................ 241/101.7; 414/245; 414/111; 414/502; 241/262; 241/270; 241/283
[58] Field of Search .............. 241/101.7, 200, 262, 241/270, 271, 283; 414/24.5, 24.6, 111, 501, 502

[56] References Cited

U.S. PATENT DOCUMENTS

| | | | |
|---|---|---|---|
| 3,873,032 | 3/1975 | Jellis et al. | 414/502 X |
| 4,034,920 | 7/1977 | Bradley | 241/200 X |
| 4,043,461 | 8/1977 | Castro | 414/502 X |
| 4,049,145 | 9/1977 | Downing et al. | 414/502 |
| 4,078,733 | 3/1978 | Popiolek | 241/200 |
| 4,094,428 | 6/1978 | White et al. | 414/501 X |
| 4,101,081 | 7/1978 | Ritter et al. | 414/245 X |
| 4,170,426 | 10/1979 | White et al. | 414/476 X |
| 4,604,018 | 8/1986 | Kruse | 414/501 X |
| 4,621,776 | 11/1986 | Hostetler | 414/24.6 X |
| 4,741,656 | 5/1988 | Bishop | 414/502 X |
| 4,778,322 | 10/1988 | Stronski | 414/24.6 |
| 4,789,289 | 12/1988 | Wilson | 414/111 X |

FOREIGN PATENT DOCUMENTS

| | | | |
|---|---|---|---|
| 3337390 | 5/1985 | Fed. Rep. of Germany | 414/24.6 |
| 2555402 | 5/1985 | France | 414/24.5 |
| 602640 | 4/1978 | U.S.S.R. | 241/283 |
| 2195976 | 4/1988 | United Kingdom | 414/24.5 |

Primary Examiner—Robert J. Spar
Assistant Examiner—Robert S. Katz
Attorney, Agent, or Firm—Richard C. Conover

[57] ABSTRACT

An improved hay feeding apparatus is mounted on a vehicle bed and utilizes a hay walker for separating portions of a bale of hay and discharging the separated hay into a windrow alongside the vehicle. The present invention utilizes a sweep to gather bales from the ground and a lifting device for lifting the bales to the bed of the vehicle. Separate conveyors on the vehicle bed transport the bales to the hay walker. The hay walker separates hay from the bale and delivers the hay to a chute for delivery to the ground.

5 Claims, 5 Drawing Sheets

FIG. I

HAY FEEDING APPARATUS

BACKGROUND OF THE INVENTION

This invention relates to an improved hay feeding apparatus mounted on a vehicle bed which includes a hay walker for separating portions of a bale of hay and discharging the separated hay into a windrow alongside the vehicle.

In feeding hay to animals, an operator often loads hay on a vehicle bed, transports the hay to a feeding area, and then feeds the hay by placing the vehicle in motion at a low speed and getting on the bed and then breaking up the bales by hand to feed them as the vehicle moves slowly ahead. This can be done in relative safety on large, open ranch lands, but the operator does not have complete control over the entire feeding operations when he leaves the cab and moves to the back of a vehicle to break up the bales. Alternatively, the feeding operation can be accomplished with two people: one in the cab, and one on the bed breaking up the bales.

When large cylindrical hay bales are being used, the operator may utilize a spindle mounted on the front of a tractor to unroll the cylindrical bale during the feeding operation. Generally only one bale can be unrolled at one time using this method. This limitation of feeding only one large cylindrical bale at a time is a constraint that limits the effectiveness of this method of feeding hay.

Neither of these techniques allow one operator to perform all the feeding tasks from a cab where the operator remains in control over all the functions associated with picking up multiple bales of the hay, transporting the hay, and then breaking up the bales sequentially to feed the bales of hay carried by the vehicle.

Presently, there are several different types of bales being used in feeding operations including small rectangular bales, large cylindrical bales, and large rectangular bales. Hay feeding machines have been developed to carry multiple bales of hay of various sizes and to breakup these bales to feed them, although in many cases, the machines developed to breakup bales have been limited to just one specific type of bale. An example of a machine for feeding multiple cylindrical bales is disclosed in U.S. Pat. No. 4,094,427 to While et al., which illustrates a method and machinery for loading and breaking up this type of bale. Another example is U.S. Pat. No. 4,170,426 to White et al., which illustrates a device which breaks up large, rectangular bales. In both instances the devices used to tear apart the bales are shredder rollers which rotate along one edge of a bale to separate hay from the bale as the hay is being urged into the shredder rollers.

Other machines have been developed to breakup bales of different sizes. U.S. Pat. No. 3,873,032 to Jellis, Jr. and U.S. Pat. No. 4,101,081 to Ritter et al. each illustrate machinery which utilize rotating drums for separating hay from a bale. Again in each instance, the mechanism for separating hay from a bale is a rotating drum having extending radial rippers. The rippers strip a portion of hay from a bale as the bale is being urged into the rotating drums.

A problem encountered when using rotating drum-like devices for separating hay from a bale is that these rotating drums tend to clog. Binder twine, baling wire, and long fibrous stems in the hay have a natural tendency to wrap around the drums instead of falling free. Once a rope-like object begins to wrap around a drum, that portion of the rotating drum loses its effectiveness in further separating hay from a bale. In addition, the object clogging the drum also tends to pick up more material as the drum continues to rotate, which in turn exacerbates the clog. When the drums, which have a heavy bale urged against the bale-accepting side of the drum, become unusably clogged, it is extremely difficult to free the clogs even with the machinery stopped. The heavy press of hay against the drum prevents an operator from having workable access to the drum.

From the above, it can be seen that a need exists for a hay feeding apparatus which can be operated by one operator who can remain in the vehicle cab. It is desirable to have this apparatus self-cleaning so that binder twine, baling wires, or other fibrous items will not clog the hay separating apparatus.

SUMMARY OF INVENTION

The present invention relates to a hay feeding apparatus which is positional on a vehicular bed and uses a vertically mounted hay walker to separate hay from a bale and discharge the separated hay into a windrow alongside the vehicle. The hay walker is mounted over a chute. By using the translational and rotational movement of the teeth of the hay walker, the device separates a portion of hay from a bale and pushes the separated portion into the chute. Additional machinery is used to load bales of hay onto the vehicle bed and urge a bale of hay located on the vehicle bed into the hay walker.

The present invention uses a sweep to gather bales from the ground and place the bales on the bed of a vehicle. Conveyors on the bed of the vehicle transport any size or shape bale to the hay walker so that hay may be separated from the bale and discharged into a windrow.

BRIEF DESCRIPTION OF THE DRAWINGS

In order that the invention may be clearly understood and readily carried into effect, preferred embodiments of the invention will now be described, by way of example only, with reference to the accompanying drawings wherein.

DESCRIPTION OF PREFERRED EMBODIMENT

Figure 1:
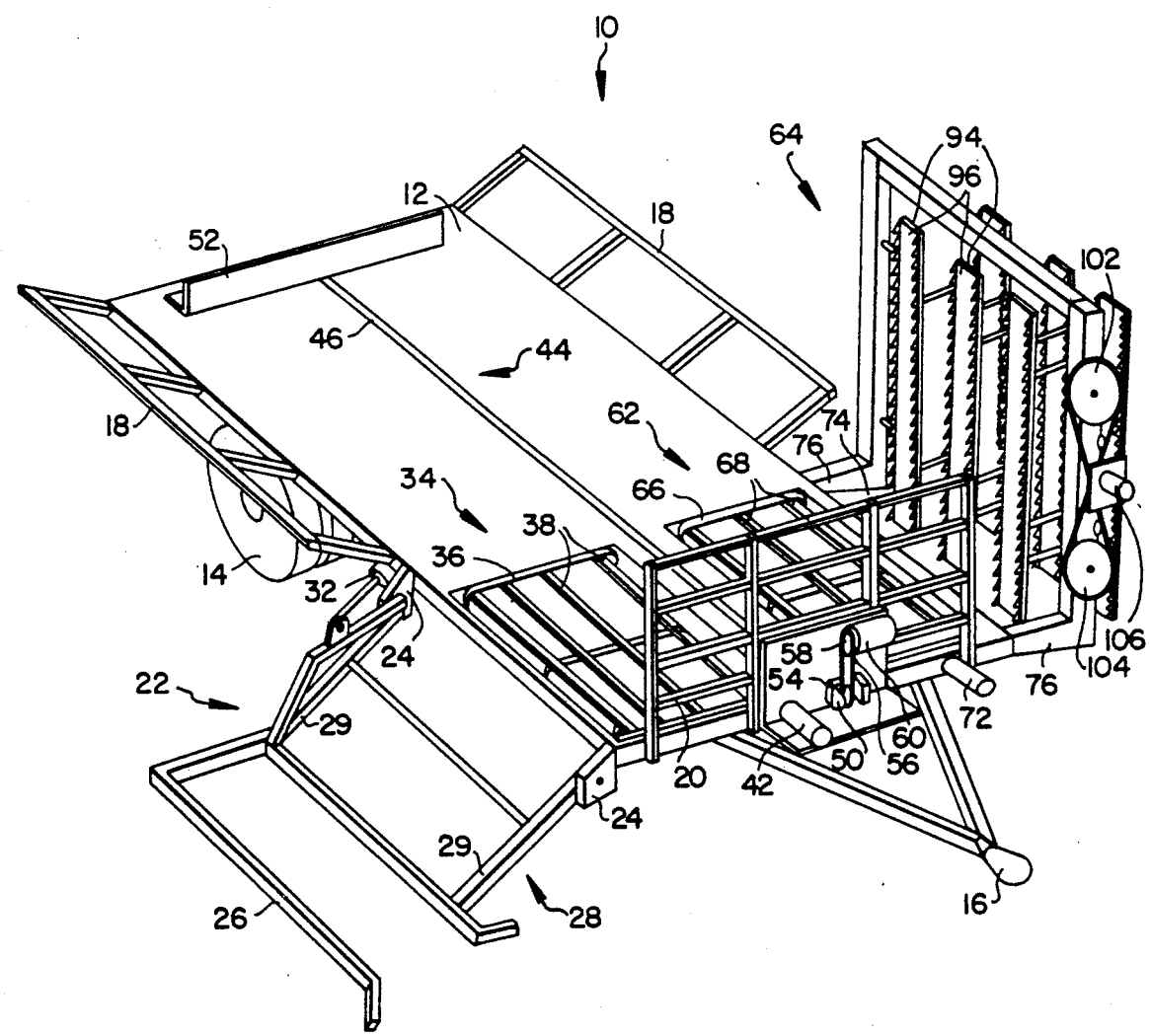
FIG. 1. is a perspective view of a hay feeding device mounted on a trailer bed.
Figure 2:
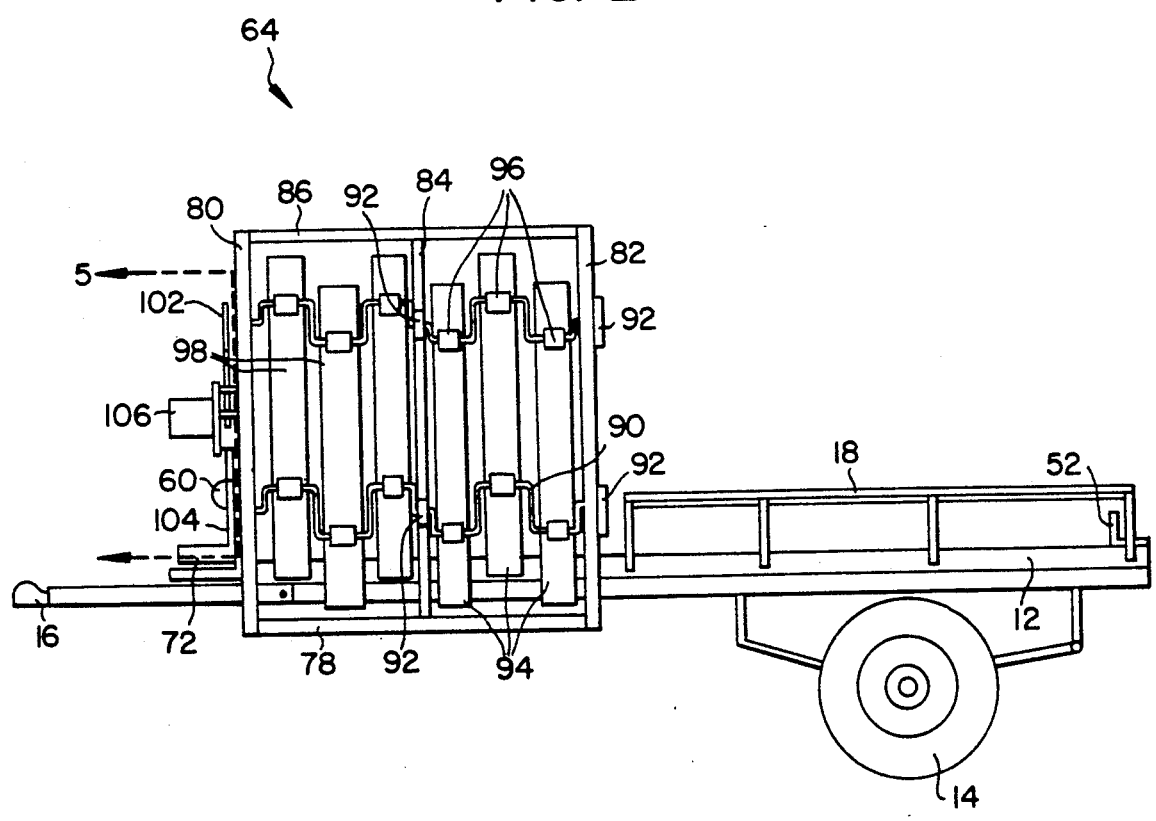
FIG. 2. is a side view of the invention shown in FIG. 1.
Figure 3:
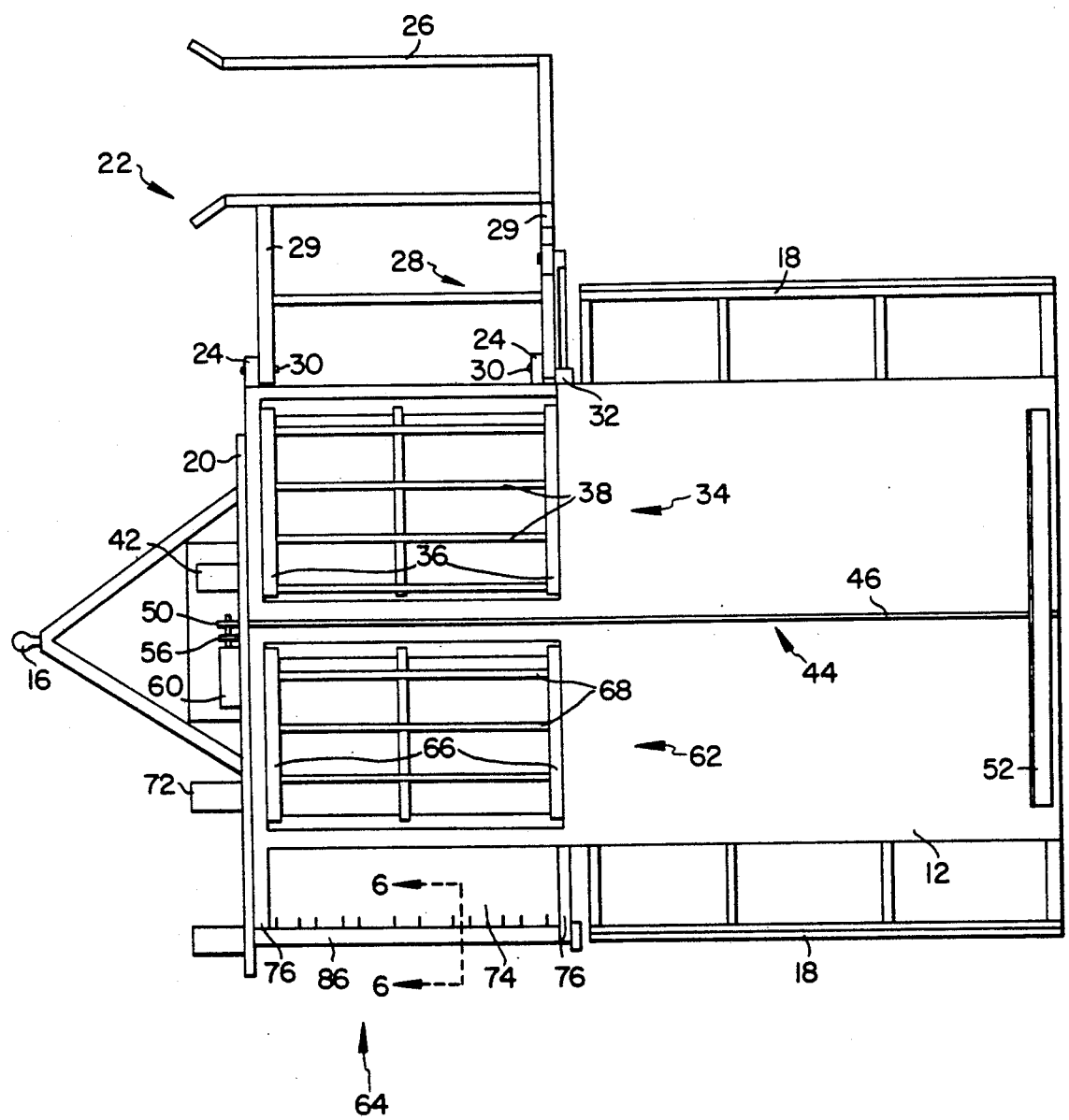
FIG. 3. is a top view of the invention shown in FIG. 1.
Figure 5:
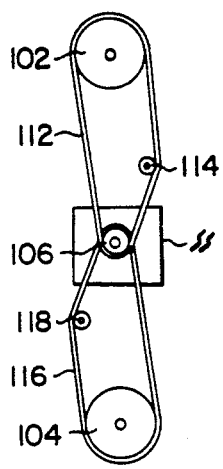
FIG. 5. is a detailed view of the drive mechanism taken along the line 5—5 in FIG. 2.
Figure 4:
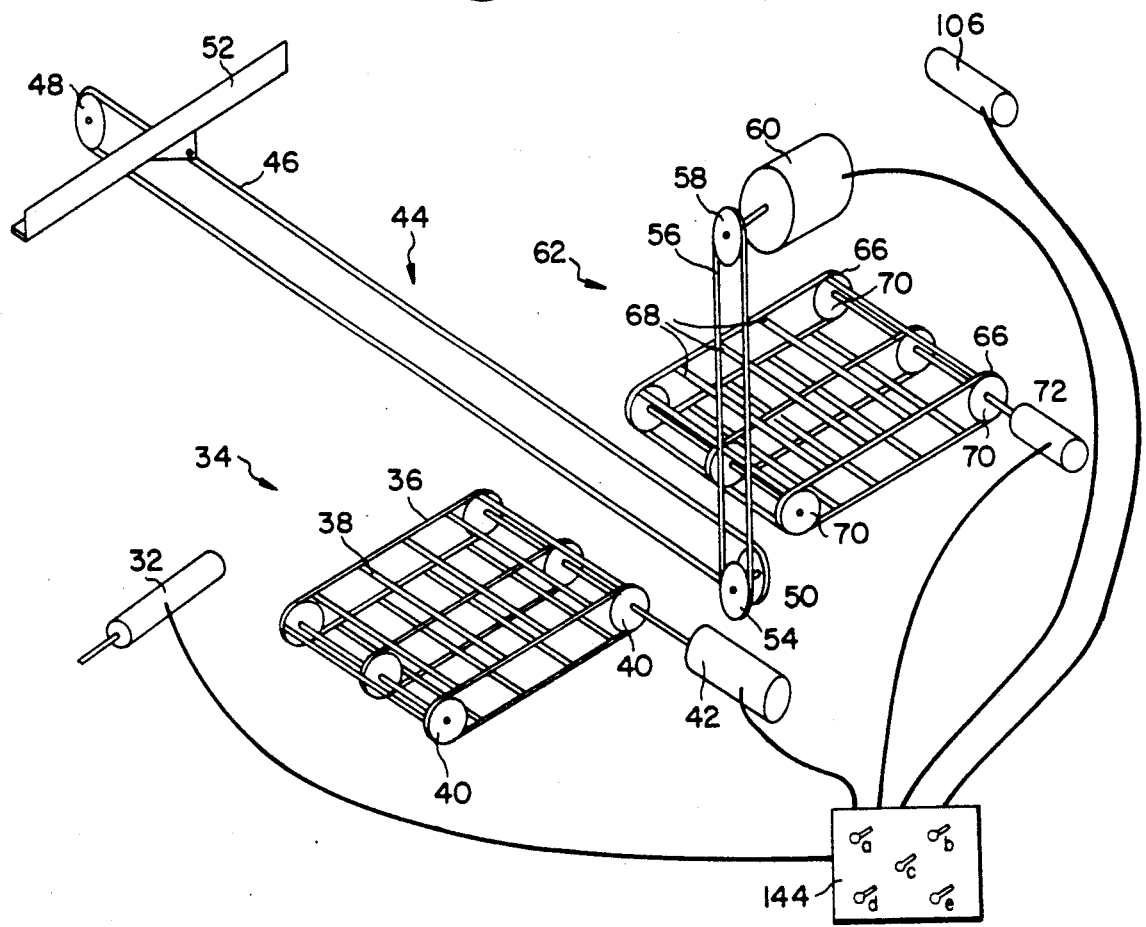
FIG. 4. is a schematic view of the conveyors shown in FIG. 1.

A preferred embodiment of a hay feeding apparatus 10 is shown in FIG. 1 as mounted on a bed 12. Bed 12 is supported by a pair of ground-engaging wheels 14 for movement across a field and has a tongue 16 at the front of bed 12 for connection to a tractor or other powered vehicle. Although bed 12 is illustrated as part of a draft vehicle, it is understood that alternatively the present invention could be self-propelled, pushed ahead of a powered vehicle, or be mounted on the bed of a truck.

Side rails 18 extend along the side edges of bed 12 and are shaped to hold either rectangular, circular, or other shaped bales on the top surface of bed 12. Front rail 20 extends across the forward portion of bed 12 in an upright position to restrict a bale of hay from moving further forward than the front of bed 12.

A bale pick up 22, which opens in the direction of forward movement of bed 12, is hingedly connected to bed 12. Bale pick up 22 has a sweep 26 sized to fit under any type of bale being lifted onto bed 12 and a framework 28 to hold sweep 26 in position. Arms 29 of framework 28, at one end are hingedly connected to journal boxes 24 by axles 30 and at the other end are rigidly connected to sweep 26. Sweep 26 rests generally flat on the ground and opens in the forward direction of travel whenever arms 29 are rotated so as to have the sweep touch the ground. A hydraulic actuator 32 is connected between bed 12 and arms 29 to rotate sweep 26 over bed 12. Whenever sweep 26 holds a bale and is rotated over bed 12, the bale rolls off sweep 26 and onto framework 28. Framework 28 then guides the bale onto bed 12

On the top surface of bed 12, a conveyor 34 is positioned to receive a bale from bale pick up 22 and move the bale laterally across bed 12. Conveyor 34 has a pair of spaced-apart endless chains 36 turning around sprockets 40 and transverse bale engaging members 38 extending between chains 36 to engage bales placed on the conveyor. Hydraulic motor 42 is connected to a sprocket 40 to move endless chain 36 over the surface of bed 12.

Another conveyor is used to move bales to the rear of bed 12 when stacking bales on the bed and to move bales to the front of the bed when the bales are being fed. Conveyor 44 is mounted generally parallel the longitudinal axis of bed 12 to move a bale longitudinally over the bed. Endless chain 46 turns around an idler sprockets 48 mounted near one end of bed 12 and turns around drive sprocket 50 near the other end. Hydraulic motor 60 powers drive sprocket 50 through the drive train of pulley 5 attached to the motor shaft, belt 56 connecting pulley 54 and 58, and pulley 58 attached to drive sprocket 50. A bale engaging rail 52, extending transversely to endless chain 46, is removably connected to endless chain 46. When moving a bale toward the rear of bed 14, bale engaging rail 52 is manually connected to endless chain 46 in front of the bale. When a bale is to be moved forward, bale engaging rail 52 is manually connected to endless chain 46 behind the bale.

A conveyor 62 receives bales from conveyors 34 and 44 and urges the bales toward a hay walker 64. Conveyor 62 has a pair of spaced-apart endless chains 66 having transverse bale engaging members 68 extending between chains 66 to engage bales placed on conveyor 62. Endless chains 66 engage sprockets 70 and turn around them. A hydraulic motor 72 is connected to one sprocket 70 to provide power to move endless chains 66.

A chute 74 is aligned beneath hay walker 64 to provide a passageway for hay to drop to the ground. Chute 74 is formed with a pair of generally parallel arms 76 rigidly connected to and extending away from bed 12, and frame member 78 rigidly connected between arms 76 at a position spaced apart from bed 12.

Hay walker 64 is rigidly mounted in an upstanding position over chute 74 on arms 76. A hay walker as contemplated by the present invention includes a rectangular frame for supporting elongate walker members 94 moving in translation as well as rotation. The rectangular frame has spaced-apart side members 80 and 82, and spaced-apart top and bottom members 86 and 78 respectively. A center frame member 84 is connected to top and bottom members 86 and 78 approximately midway between side members 80 and 82. Cranks 88 and 90 extending on parallel axes between side frame members 80 and 82 are rotatably held by bearings 92 located in side frame members 80 and 82, and center frame member 84.

The hay walker has a plurality of side-by-side elongate walker members 94, each having a face 96 and rear surface 98. The elongate walker members 94 are connected to cranks 88 and 90 with bearings 100 attached on rear surface 98. As cranks 88 and 90 rotate, elongate walker members 94 have a translational up-and-down movement when viewed in the direction of face 96, and have a circular movement when viewed along the axis of either crank 88 or 90. Sprockets 102 and 104 are connected to cranks 88 and 90 respectively on the side of frame member 80 opposite center frame 84.

A hydraulic motor 106 is mounted on motor mount 108 intermediate sprockets 102 and 104 and has a dual-drive sprocket 110 attached to the motor shaft. An endless chain 112 engages sprocket 102, idler sprocket 114, and one sprocket of dual sprocket 110 to power crank 88, while another endless chain 116 engages sprocket 104, idler sprocket 118 and the other sprocket on dual-drive sprocket 110 to power crank 90. As hydraulic motor 106 turns dual sprocket 110, dual sprocket 110 rotates parallel cranks 88 and 90 at the same rotational speed so that faces 96 remain oriented in approximately the same direction throughout a complete revolution of sprockets 102 and 104.

Figure 6:
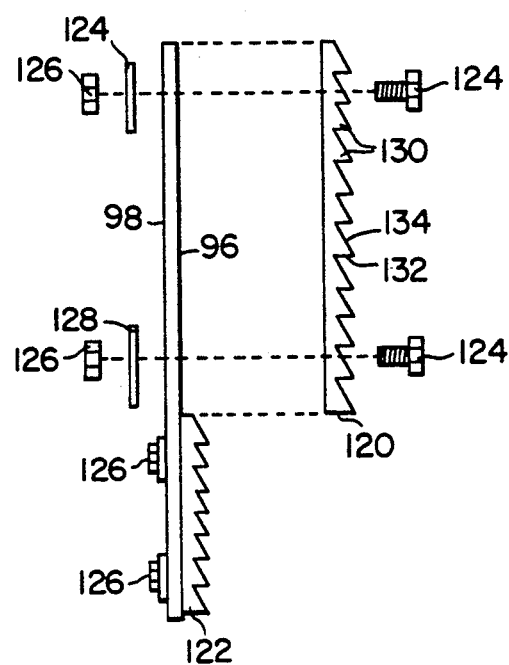
FIG. 6. is a side view of one elongate member with background removed taken along the line 6—6 in FIG. 3.

As shown in FIG. 6, separating blades 120 and 122 extend longitudinally in line along face 96 of each elongated member 94 with teeth 130 extending outwardly from face 96. Separating blades 120 and 122 are mounted on elongate member 94 by bolts 124, washers 126, and nuts 128 and can be removed individually from elongate member 94 to reduce the number of teeth capable of engaging a bale when the hay walker is operating. Reducing the number of teeth engaging a bale during a cycle of sprockets 102 and 104, reduces the quantity of hay separated from a bale during each cycle. Each tooth 130 on separating blades 120 and 122 has an engaging edge 132 which lies generally perpendicular with face 96 and a sloping edge 134 which extends outwardly and downwardly from face 96. Alternatively, tines, differently shaped teeth, or differently shaped protrusions, could be substituted for blades 120 and 122 to separate a portion of hay from a bale.

Figure 7:
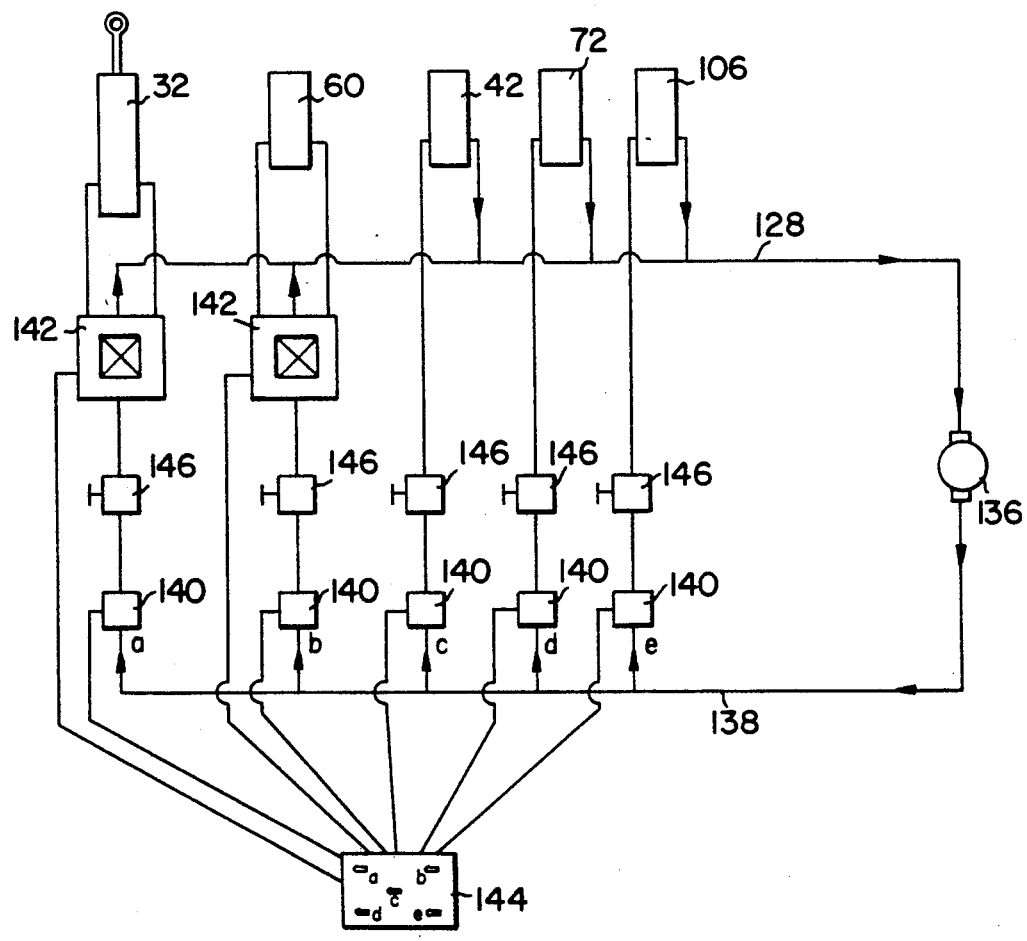
FIG. 7. is a schematic of the hydraulic drive system.

A hydraulic system may be used to provide power to the hay walker, conveyors, and bale pick up, although electric or pneumatic motors could be used as easily. A switch box 144 is located in the vehicle conveniently close to an operator to control the hydraulic system. As shown in a schematic at FIG. 7, hydraulic pump 136 provides pressure to hydraulic manifold 138. Solenoids 140, individually activated by switches 144c, 144d, and 144e on switch box 144 permit hydraulic fluid to flow to hydraulic motors 42, 72, and 106 respectively. In each flow path a flow control valve 146 also permits adjusting the maximum rate of flow.

Because bale pick up 22 and conveyor 44 need to operate bi-directionally, a directional control valve 142 is also included in the flow path toward hydraulic actuator 32 and hydraulic motor 60 in addition to solenoids 140. Directional control valve 142 and solenoid 140 in these paths are activated by bi-directional switches 144a and 144b on switch box 144 to either lift or lower sweep 26, or move bale engaging rail 52 forwardly or rearwardly on bed 12. Once hydraulic fluid passes through a hydraulic motor or actuator, it is returned to hydraulic pump 136 through return manifold 148.

In operation, bale engaging rail 52 is positioned near the front of bed 12 as hay feeding apparatus 10 is pulled to place sweep 26 beneath a bale of hay. Switch 144a on switch box 144 is activated which activates hydraulic actuator 32. Hydraulic actuator 32 retracts to rotate bale pick up 22 about axle 30 to move the bale pick up in an arc to lift a bale over bed 12. Near the top of the arc, the bale rolls off sweep 26 and is guided onto conveyor 34 by framework 28.

The bale can be selectively positioned on bed 12 by activating conveyor 34 or conveyor 62 as appropriate. Either switch 144c, 144d, or both, on switch box 144 are activated to have conveyor 34 or conveyor 62 move the bale laterally across bed 12. Once the bale is in a proper lateral position, conveyor 34 and conveyor 62 are deactivated and switch 144b on switch box 144 is activated to have conveyor 44 move the bale toward the rear of bed 12. The sequence of steps can be repeated to load additional bales and position the bales on bed 12.

Hay feeding apparatus 10 is then pulled to the feeding area. Bale engaging rail 52 is manually relocated from the front of bed 12 to the rear and is reattached to endless chain 46 for use in moving bales forward as desired. When activated, bale engaging rail 52 contacts the rear portion of any bales resting on bed 12 and moves all the bales contacted forward towards conveyors 34 and 62. After the bales are moved forward, conveyor 34 can then move bales laterally as necessary to position bales on conveyor 62. Hay walker 64 and conveyor 62 are then activated to separate hay from a succession of bales as will be described.

Hydraulic motor 72 on hay walker 64, when activated, turns cranks 88 and 90 by means of chains 112 and 116 respectively. Elongate walker members 94, connected to cranks 88 and 90 by means of bearings 100, move transversely as viewed from conveyor 62 and have teeth 130 extending outwardly from face 96 of elongate walker members 94 toward conveyor 62. As conveyor 62 urges a bale of hay against transversely moving face 96, teeth 130 engage a portion of the hay and separate the portion from the bale. Hay separated during the downward portion of one cycle of an elongate member 94 is pulled downward toward chute 74 by teeth 130.

As the rotational cycle of the elongate member 94 continues, teeth 130 disengage the separated portion of hay and are pulled away from the bale during the lower portion of the cycle as the elongate member starts to move upward. Adjacent elongate walker members 94, on the upper portion of the cycle, are rotating toward the urging conveyor by the motion of cranks 88 and 90 and engage the bale as their adjacent elongate walker members are being pulled away from the bale by the cranks. The separated portion of hay falls free of the teeth and enters chute 74 to fall through the chute to the ground. Entanglements, such as twine, that may have been caught by teeth 130 in the downward portion of the cycle are also released as an elongate member 94 moves away from the bale and adjacent elongate walker members 94 engage the entanglements and the bale. The entanglements fall free down chute 74 with the released portion of hay.

Conveyor 62 continues to urge the bale against faces 96 of hay walker 64. If too much hay is being separated during each cycle of an elongate member 94, separating blade 120 or 122 can be removed from face 96 of elongate member 94, thereby reducing the number of teeth engaging the bale during one cycle of elongate walker members 94.

Apparatus 10 can be used with any sized bales. It is not necessary to cut the bale binding twine as teeth 130 will cut the twine as the bale is being fed.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A feeding apparatus mounted on a vehicle for separating hay from a bale of hay, the feeding apparatus comprising:
   a bed mounted on the vehicle for supporting the bale of hay;
   a chute for diverting hay away from the bed;
   a hay walker mounted to the bed above the chute, the haywalker including a moveable elongate walker member having a front face and a rear surface and further having teeth attached to the front face and extending outwardly from the face, means for maintaining the teeth in substantially the same direction relative to the hay bale during movement of the elongate member, and means for moving the teeth and the elongate member toward the hay bale, then downward toward the upper end of the chute, then away from the hay bale, then upward to a point of beginning, the teeth separating hay from the bale and directing the hay to an upper end of the chute as the teeth move downwardly;
   a first conveyor means located on the bed for conveying the bale of hay to the hay walker; and
   switch means for selectively activating the conveyor.

2. A feeding apparatus according to claim 1 including a bale pick-up apparatus hingedly mounted along one side of the bed, the bale pick-up apparatus including a sweep, a sweep lifting means for lifting the sweep from a side of the bed upwardly and over the bed for dropping a bale picked up by the sweep onto the bed, and guide means for guiding the bale onto the bed when the bale is dropped on the bed.

3. A feeding apparatus according to claim 1 further including a second conveyor means mounted on the bed for relocating bales on top of the bed and moving bales to the first conveyor means, a power means for driving the second conveyor means, and a switch means for selectively activating the power means.

4. A feeding apparatus according to claim 1 wherein the means for moving the teeth includes a crank rotatably connected to the elongate member, and a motor for driving the crank.

5. A feeding apparatus according to claim 1 wherein the hay walker includes a plurality of elongate members positioned side-by-side above the chute with each elongate walker member rotatably connected to the means for moving the teeth so that an elongate member moves away from the hay bale whenever an adjacent elongate member moves toward the hay bale whereby hay in the teeth of the elongate member moving away from the hay bale is pushed away from the teeth by an adjacent elongate member moving toward the hay bale.

* * * * *